June 15, 1954  L. C. CHANYI  2,681,108
TRIMMING METHOD AND APPARATUS
Filed Dec. 12, 1950  2 Sheets-Sheet 1
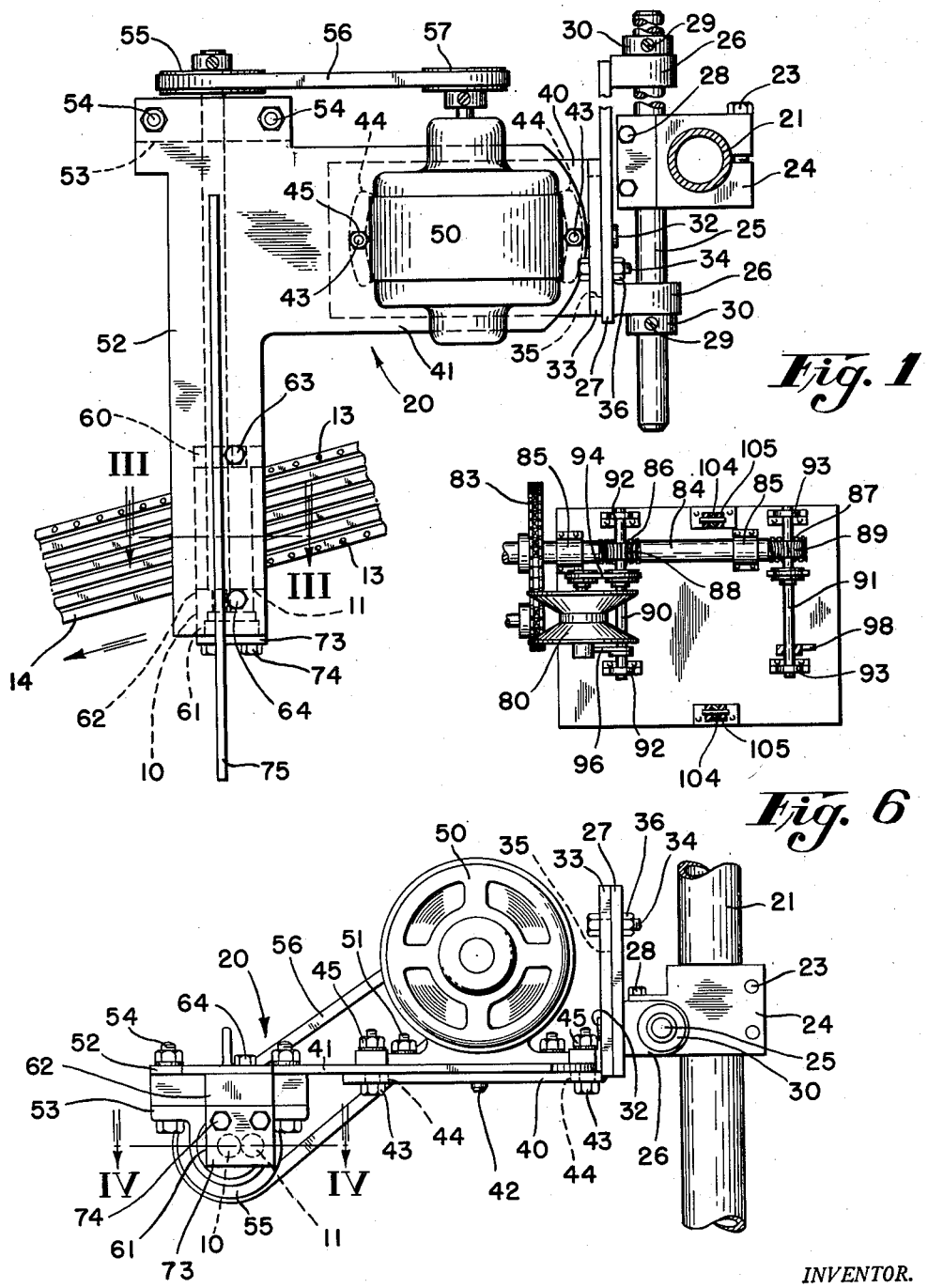
INVENTOR.
LOUIS C. CHANYI
BY James J. Long
AGENT.

June 15, 1954 L. C. CHANYI 2,681,108
TRIMMING METHOD AND APPARATUS
Filed Dec. 12, 1950 2 Sheets-Sheet 2

INVENTOR.
LOUIS C. CHANYI
BY James J. Long
AGENT.

Patented June 15, 1954

2,681,108

UNITED STATES PATENT OFFICE 2,681,108

TRIMMING METHOD AND APPARATUS

Louis C. Chanyi, Grosse Pointe Woods, Mich., assignor to United States Rubber Company, New York, N. Y., a corporation of New Jersey Application December 12, 1950, Serial No. 200,458

2 Claims. (Cl. 164—84.5)

This invention relates to a method and apparatus for removing projections from molded rubber articles, and more particularly it relates to trimming, from pneumatic tires and the like, projections formed thereon in the course of the molding operation as a result of flow of rubber into the air vents provided in the mold for the escape of air.

In molding rubber articles such as pneumatic tires, it is usual to provide the mold with small vent holes leading from the mold cavity through the body of the mold into the outside atmosphere. Such vent holes permit air and gases to be displaced more readily from the mold cavity by the rubber stock being molded, thereby facilitating the flow of stock into intimate contact with the entire surface of the mold cavity. This insures that the tire or other article will be properly formed. In the course of the molding operation, some of the rubber stock, under the influence of heat and pressure, flows into the vent holes. As a result, when the molded tire, or other article, is removed from the mold, the tire has on its surface molded projections corresponding to the vent holes. Such projections require removal before the tire is marketed.

The methods and apparatus heretofore available for removing vent projections have not been entirely satisfactory. It has been customary to remove the vent projections by cutting them off, or abrading them off, but such methods have limited effectiveness and they frequently result in tires of poorer appearance than is desirable because parts of the projections remain on the tire, or disfiguring marks are left on the tire. Also, such methods have been more costly than is desirable, by reason of the fact that they are relatively slow, they require extra labor, and they sometimes result in injury to the tire by the cutting knife or abrading mechanism, making it necessary to discard or repair the tire, or sell it as a "second grade" tire.

Accordingly, a principal object of the present invention is to provide an improved method of trimming projections from tires or other molded articles, which can be carried out rapidly and effectively.

Another object is the provision of an apparatus for removing vent projections rapidly from tires and the like without injuring the tire.

Still another object of the invention is to provide a method of trimming tires which results in tires of neat, uniform appearance.

These and other objects and advantages of the invention will be made evident in the following detailed description when read with reference to the accompanying drawings, wherein:

Fig. 1 is a plan view of a trimming device constructed according to the invention, shown in operative contact with a tread portion of a pneumatic tire having vent projections on its surface;

Fig. 2 is an elevation of the trimming device of Fig. 1;

Fig. 6 is a sectional view of the apparatus taken along line 6—6 of Fig. 5; and

Figure 5:
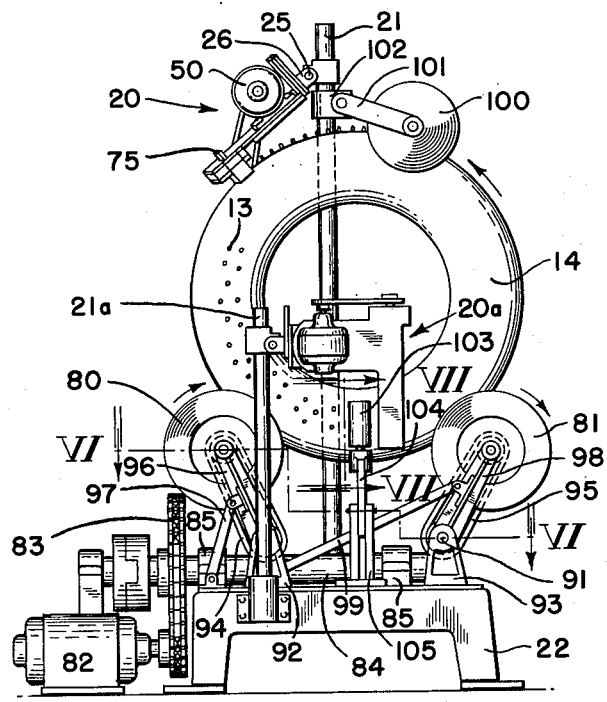
Fig. 5 is an elevational view of a plurality of trimming devices mounted for trimming various surfaces of a tire simultaneously while rotating same.
Figure 4:
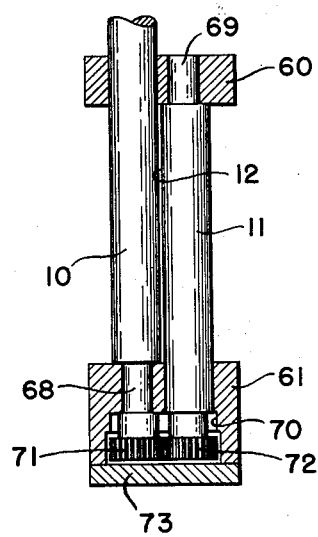
Fig. 4 is an enlarged sectional view of the trimming portion of the apparatus taken along line 4—4 of Fig. 2.

The invention contemplates removal of vent projections or similar protrusions from the surface of a molded rubber article by pulling such projections away from the surface. This may be accomplished by bringing the surface of the rubber article into engagement with a pair of closely spaced pinch rollers which are rotated in opposite directions in such manner as to draw the projections between the rollers and away from the surface of the rubber article. The projections are thereby pulled away from the surface and subjected to tensile force in such manner that they break off cleanly and smoothly flush with the surface of the article.

Referring to the drawing, and in particular to Figs. 1 to 4, the trimming apparatus shown comprises a pair of opposed driven pinch rollers 10 and 11 having a slight clearance 12 (Fig. 4) therebetween. Removal of vent projections 13 from the surface of a tire 14, or other molded rubber object, is accomplished, as shown most clearly in Fig. 3, by pinching the projections 13 between the rollers 10, 11 which are mounted for rotation in opposite directions in a manner that will be described in detail below, so as to draw the projections 13 into the clearance 12 between the rollers 10, 11. The action of the pinch rollers is such that the projection 13 is drawn away from the surface of the tire 14 causing the tire casing to form an outward bulge 15 extending toward the nip between the rollers. The drawing and pinching action of the rollers 10, 11 causes the projection 13 caught therebetween to neck down at its base 17 until the tensile strength of the rubber is exceeded, whereupon the projection 13 breaks off at its base even with the surface of the tire 14.

For convenience in positioning the pinch rollers 10, 11 in operative engagement with the molded object to be trimmed, the rollers are mounted on a frame assembly unit 20, adapted to be raised or lowered as desired on a vertical supporting standard 21. The lower end of the standard 21 may be secured to a suitable base 22 (Fig. 5). The frame unit 20 may be fixed at a desired height by tightening horizontal bolts 23 (Figs. 1 and 2) provided for this purpose in a vertically split sliding clamp member 24 by which the frame 20 is slidably mounted on the standard 21. The split clamp member 24 also permits the frame assembly 20 to be rotatably adjusted about the vertical standard 21 in a horizontal plane. The clamp member 24 is also horizontally split and accommodates a horizontal shaft 25 on which the frame assembly unit 20 is pivotally mounted by means of two horizontally spaced bearings 26 secured to the face of a vertical plate 27 of the frame unit 20. The horizontal shaft 25 may be fixed in place with respect to the sliding clamp 24 by tightening vertical bolts 28 passing through the clamp 24. The arrangement is such that the frame assembly 20 is adapted to be rotated about the shaft 25 on bearings 26.

The frame assembly 20 is also slidable along the length of the shaft 25, and may be fixed at a desired longitudinal position thereon by tightening set screws 29 provided on two sliding collars 30 on the shaft, one of such collars engaging the outer face of each of the bearings 26 to restrain the assembly against longitudinal movement when the set screws 29 are tightened.

Provision is also made for angular adjustment of the frame assembly unit 20 about a horizontal axis running transversely of the axis of the shaft 25. Such angular adjustment is made possible by a horizontal pivot pin 32 extending through the vertical plate 27 and through an adjacent vertical plate 33, the opposing faces of the two plates 27, 33 being maintained in sliding engagement by the pin 32 and by a bolt 34 which passes through a hole in the plate 27 and through an opposed arcuate slot 35 in the plate 33. By loosening a nut 36 on the end of the bolt 34 the plate 33 may be adjusted angularly about the pivot pin 32 as a center, the bolt 34 sliding in the arcuate slot 35 as such adjustment is made, and the plate 33 may be fixed with respect to the plate 27 at the desired angle by tightening the nut 36.

Rigidly secured to the lower portion of the vertical plate 33 and extending laterally therefrom there is a horizontal supporting plate 40, on the upper surface of which a second horizontal supporting plate 41 rests. A vertical pivot pin 42 (Fig. 2) passes through the two plates 40, 41 whereby the upper plate 41 may be rotated with respect to the lower plate in a horizontal plane. Bolts 43 pass through holes in the plate 41 and through opposed arcuate slots 44 in the lower plate 40, permitting the plates 40, 41 to be fixed with respect to each other by tightening nuts 45 on the ends of the bolts when proper relationship of the two plates is achieved.

The horizontal plate 41 carries on its upper surface a motor 50 for driving the pinch rollers 10, 11. The motor 50 is secured to the plate 41 by bolts 51 (Fig. 2). An elongated laterally extending section 52 of the plate 41 carries on its lower face at one end a journal assembly 53 which is secured to the section 52 by bolts 54 passing therethrough. One pinch roller 10, which is elongated, is rotatably supported at one end in the journal assembly 53, and passes to the opposite extremity of the extension 52. A pulley 55 on the end of the roller 10 projecting from the journal 53 is connected by means of a belt 56 to a pulley 57 on the shaft of the driving motor 50. Toward the opposite end of the extension 52, the roller 10 passes rotatably through the lower portion of two spaced supporting members 60 and 61 which extend downwardly from the underside of a spacer piece 62 secured to the bottom of the extension 52 by bolts 63 and 64 which extend downwardly through the extension 52 and spacer piece 62 and are threaded into the supporting members 60 and 61, respectively.

The end portion 68 (Fig. 4) of the roller 10 is of reduced diameter where it passes through the support 61. The remaining pinch roller 11 has a reduced portion 69 rotatably supported in the supporting member 60 and the other end of the roller 11 is rotatably supported in member 61. A recessed portion 70 in the outer face of the supporting member 61 serves as a housing for intermeshing gears 71 and 72 carried on the ends of the shafts 10 and 11 respectively. The arrangement is such that rotation of the driven pinch roller 10 is transmitted by gears 71 and 72 to the other pinch roller 11, which thereby rotates in the opposite direction. A plate 73 on the outer face of the supporting member 61 encloses the recess 70. The plate 73 is fastened to the supporting member 61 by means of bolts 74 passing therethrough.

An elongated bar 75 welded to the upper surface of the plate section 52 extends outwardly from the assembly and serves as a handle to be grasped by the operator in manipulating and positioning the assembly against the surface of the tire 14. The tire is preferably disposed at an angle with respect to the transverse axis of the pinch rollers, as indicated in Fig. 1, in order that the projections will more readily be pulled into the space between the rollers.

In Fig. 5 the pneumatic tire casing 14 from which it is desired to remove rows of vent projections 13 on the tread and sidewalls of the tire, is shown positioned on a device adapted to rotate the tire in engagement with a plurality of driven pinch roll mechanisms of the character described. One such unit 20 is shown mounted on the upright 21 and adjusted to a suitable angular position for trimming vent projections from the tread surface, while another such unit 20a is shown positioned on upright 21a for trimming vent projections from the sidewall. It will be understood that as many such units as desired may be positioned in contact with the various surfaces of the tire to remove the vent projections as the tire is rotated.

The tire is supported in a vertical position on two driven concave pulleys 80 and 81 which engage the underside of the tire and which are supported above the base 22 of the machine. For rotating the tire, there is provided a driving motor 82 which drives, through a sprocket and chain arrangement 83, a horizontal shaft 84 rotatably supported in journals 85 on top of the base 22. Longitudinally spaced worm gear sections 86 and 87 (Fig. 6) on the shaft 84 engage gears 88 and 89 carried by transverse shafts 90 and 91 which are rotatable in bearings 92 and 93 respectively, on top of the base 22. Driving belts 94 and 95 pass from suitable pulleys on shafts 90 and 91 respectively, to pulleys on the shafts of the concave rollers 80 and 81 respectively. The pulley 80 is rotatably supported on a bracket 96 extending from the shaft 90. The shaft 90 extends rotatably through a hole in the lower portion of the bracket 96, and a rigid arm 97 (Fig. 5) extends from the bracket 96 to the base 22 to maintain the bracket in place. The pulley 81 is similarly supported on a bracket 98 extending from the shaft 91, and an arm 99 extends from the bracket 98 to the base 22.

A concave guide pulley 100 engaging the upper surface of the tire is rotatably supported on the end of an arm 101 that is pivotally attached to a bracket 102 on the upright 21.

Figure 7:
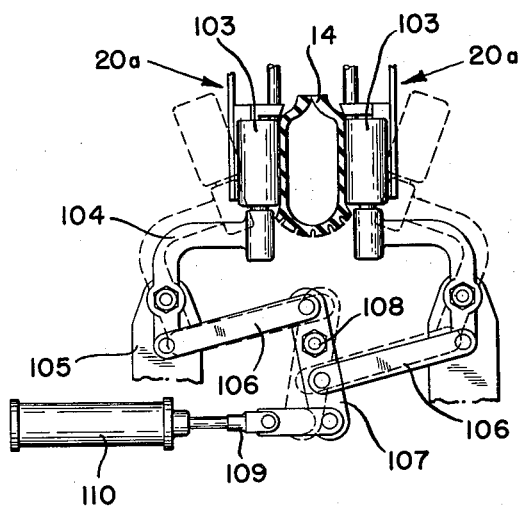
Fig. 7 is an enlarged sectional view taken along line 7—7 of Fig. 5.

The lower sidewall of the tire casing is engaged at each side by an upright roller 103 which bears against each tire sidewall, thereby flattening the same, as shown in Fig. 7, in order to present a flattened sidewall surface as the revolving tire approaches the pinch roll unit 20a, so that the pinch rolls will be brought into operable engagement with a greater area of the sidewalls and thereby effectively remove the projections from a greater area in a single operation. Each of the rollers 103 is carried in the top of a swinging arm 104, pivotally mounted on top of standards 105 extending upwardly from the base 22. As indicated in Fig. 7, pivotal links 106 join the lower ends of the swinging arms 104 to a fulcrum member 107 that is in turn pivotally mounted on the framework of the machine by a fixed pivot pin 108. The lower end of the fulcrum member 107 is pivotally connected to a piston rod 109 of an actuating cylinder 110 that is capable of moving the rollers 103 away from the tire as indicated by the dotted lines in Fig. 7, for convenience in inserting or removing the tire.

In operation, the trimming units 20, 20a, the upper guide pulley 100, and the arms 104 carrying the sidewall flattening rolls 103 are moved out of the way and there is placed on the concave pulleys 80, 81 a tire casing 14 having rows of vent projections 13 disposed along each marginal edge of the tread and along the portion of the sidewall near the beads of the tire. The guide pulley 100 is then lowered into position on the upper surface of the tire, as shown in Fig. 5, and the arms 104 are swung inwardly by actuating the cylinder 110 to bring the rolls 103 against the tire sidewalls, flattening the sidewalls as shown in Fig. 7.

The pulleys 80 and 81 carrying the tire 12 are then driven by the motor 82 through the driving mechanism comprising sprocket and chain 83, shaft 84 carrying worms 86 and 87, gears 88 and 89 on transverse shafts 90 and 91, and finally belts 94 and 95, causing the tire to rotate. The operator, with the aid of the handles on the various trimming units, such as the bar 75 on unit 20, then swings such units against the various surfaces of the rotating tire where the vent projections are located. This is accomplished by swinging, for example, the trimming unit 20, which engages the tread surface of the tire, downwardly about the shaft 25 on brackets 26, such trimming unit having previously been angularly adjusted about the pivot 42 (Fig. 2) in a plane passing through the longitudinal axis of both of the pinch rollers as well as about pivot 32 in a plane transverse to the foregoing plane and transverse to the longitudinal axis of the rollers.

Figure 3:
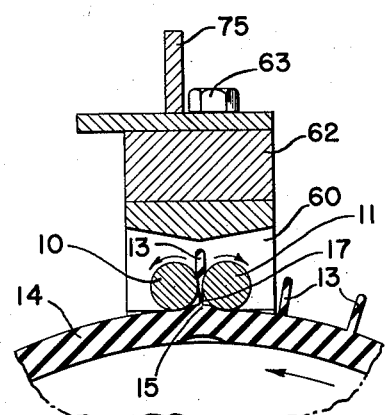
Fig. 3 is an enlarged fragmentary sectional view on a larger scale taken along line 3—3 of Fig. 1, showing how the trimming mechanism engages the vent projections on the tire.

In this manner the pinch rollers are presented to the tire surface with the plane extending through the longitudinal axis of both of the rollers perpendicular to the longitudinal axis of the individual vent projections, as indicated most clearly in Fig. 3, and the direction of travel of the row of vent projections as the tire rotates is generally in a direction transverse to the longitudinal axis of the pinch rollers, as indicated most clearly in Fig. 1. The pinch rollers are brought up against the tire surface with moderate pressure. The pinch rollers may be rotated fairly rapidly, say, for example, at a speed of 1200 R. P. M., and they have a diameter and clearance space 12 (Fig. 4) therebetween such that the projections 13 are effectively pinched without slippage and drawn forcibly away from the tire surface as indicated in Fig. 3. The speed of rotation of the tire is preferably such that one projection is drawn into the nip of the rollers and removed before the next successive projection comes into position between the rollers. It may be mentioned by way of non-limiting example that moderate speeds of rotation, such that a single revolution of the tire takes say 5 or 8 seconds, may be used. With a sufficient number of trimming units disposed about the tire in suitable position, a single revolution of the tire is sufficient to trim the entire surface of all vent projections in the manner described.

From the foregoing, it is evident that by the method of the invention tires and the like may be trimmed of vent projections rapidly without danger of damaging the tires. By pulling the projections away from the rubber surface in a direction essentially normal to the surface as described, the projections break off cleanly flush with the surface. This is due to the fact that as the projections are drawn away from the surface the tensile stresses are concentrated at the point where the base of the projection joins the rubber surface, and the projection necks down at this point, as indicated at 17 in Fig. 3, and breaks off at the base leaving a smooth surface.

The apparatus is convenient to operate and simple to maintain since there are no cutting knives to sharpen periodically, as in conventional practice.

Furthermore, unlike cutting knives, there is virtually no possibility for the pinch rollers to damage the tires. Also, the pinch rollers cannot produce improper trimming, as is the case when cutting knives become dull through use. The pinch rollers retain their effectiveness throughout an indefinite period of service, since there is no appreciable wear on the rollers.

By mounting the pinch rollers as described on a supporting frame adjustable in various planes to a suitable angle with respect to the object to be trimmed, the pinch rollers are enabled to act with maximum effectiveness. By mounting a tire casing for rotation with respect to a plurality of the pinch roller units, it is possible to trim the tire in a comparatively short time, thereby making for economy of operation. The pinch rollers are enabled to act on the maximum area of the tire sidewall by flattening the sidewall in proximity to the pinch rollers.

Having thus described my invention what I claim and desire to protect by Letters Patent is:

1. An apparatus for trimming projections from a rubber article comprising a supporting plate, a pair of pinch rollers rotatably mounted on said supporting plate, a driving motor mounted on said supporting plate and operatively connected to said pinch rollers for rotating said rollers in opposite directions, a second supporting plate parallel to and pivotally secured to the said first-mentioned supporting plate for pivotally adjusting the position of the rollers in a plane passing through the longitudinal axis of both of the rollers, means for fixing the two said plates rigidly together at a desired adjusted position, a further pivotal mounting secured to said second plate for adjusting said second plate in a plane perpendicular to said first-mentioned plane, and means for securing said second-mentioned plate at a desired adjusted position in said second-mentioned plane.

2. An apparatus for trimming projections from a rubber article comprising a supporting plate, a pair of pinch rollers rotatably mounted on said supporting plate, a driving motor mounted on said supporting plate and operatively connected to said pinch rollers for rotating said rollers in opposite directions, a second supporting plate parallel to and pivotally secured to the first-mentioned supporting plate for pivotally adjusting the position of the rollers in a plane passing through the longitudinal axis of both of the rollers, means for fixing the two said plates rigidly together at a desired adjusted position, a further pivotal mounting secured to said second plate for adjusting said second plate in a plane perpendicular to said first-mentioned plane, and means for securing said second-mentioned plate at a desired adjusted position in said second-mentioned plane, a supporting standard on which the said plates, driving means and rollers are mounted as a unit, and a swinging attachment between said unit and said supporting standard whereby said unit may be swung into and out of engagement with a rubber article to be trimmed.

References Cited in the file of this patent
UNITED STATES PATENTS

| Number | Name | Date |
| --- | --- | --- |
| 1,233,904 | Patton | July 17, 1917 |
| 1,916,258 | Errig et al. | July 4, 1933 |
| 1,956,331 | Mullin | Apr. 24, 1934 |
| 2,246,228 | Winter | June 17, 1941 |
| 2,375,542 | Euth | May 8, 1945 |
| 2,429,945 | Rayburn | Oct. 28, 1947 |
| 2,456,699 | Hanson et al. | Dec. 21, 1948 |
| 2,524,489 | Strong | Oct. 3, 1950 |